(12) United States Patent
Huang

(10) Patent No.: US 11,143,843 B2
(45) Date of Patent: Oct. 12, 2021

(54) PROJECTION LENS ASSEMBLY

(71) Applicant: ZHEJIANG SUNNY OPTICAL CO., LTD., Ningbo (CN)

(72) Inventor: Lin Huang, Ningbo (CN)

(73) Assignee: ZHEJIANG SUNNY OPTICAL CO., LTD.

(*) Notice: Subject to any disclaimer, the term of this patent is extended or adjusted under 35 U.S.C. 154(b) by 233 days.

(21) Appl. No.: 16/293,103

(22) Filed: Mar. 5, 2019

(65) Prior Publication Data

US 2019/0196145 A1    Jun. 27, 2019

Related U.S. Application Data

(63) Continuation of application No. PCT/CN2018/088685, filed on May 28, 2018.

(30) Foreign Application Priority Data

Dec. 19, 2017  (CN) .......................... 201711375247.1
Dec. 19, 2017  (CN) .......................... 201721780862.6

(51) Int. Cl.
 G02B 13/00    (2006.01)
 G02B 9/06     (2006.01)
 G02B 13/16    (2006.01)
 G02B 13/02    (2006.01)

(52) U.S. Cl.
 CPC ............. *G02B 13/003* (2013.01); *G02B 9/06* (2013.01); *G02B 13/008* (2013.01); *G02B 13/02* (2013.01); *G02B 13/16* (2013.01)

(58) Field of Classification Search
 CPC ...... G02B 13/003; G02B 13/14; G02B 13/16; G02B 13/008; G02B 9/04; G02B 9/06; G02B 9/08

USPC ......................................................... 359/651
See application file for complete search history.

(56) References Cited

U.S. PATENT DOCUMENTS

| 7,684,129 | B1 |   | 3/2010 | Wang et al. |
| 8,848,299 | B2 |   | 9/2014 | Qui et al. |
| 10,302,907 | B2 | * | 5/2019 | Asami ................. G02B 13/14 |
| 10,466,451 | B2 | * | 11/2019 | Tsai ..................... G02B 13/008 |
| 10,488,674 | B2 | * | 11/2019 | Liu ...................... G02B 13/003 |

(Continued)

FOREIGN PATENT DOCUMENTS

| CN | 1740838 A | 3/2006 |
| CN | 107436484 A | 12/2017 |

(Continued)

OTHER PUBLICATIONS

"Optical Glass." Hoya Optics, 2021, hoyaoptics.com/optical-glass/. (Year: 2021).*

(Continued)

*Primary Examiner* — Zachary W Wilkes
(74) *Attorney, Agent, or Firm* — Barnes & Thornburg LLP

(57) ABSTRACT

The present disclosure discloses a projection lens assembly. The projection lens assembly includes, sequentially from an image-source side to an image side along an optical axis, a first lens having a positive refractive power; and a second lens having a positive refractive power. At least one of the first lens or the second lens is a glass lens. A total effective focal length f of the projection lens assembly and an effective focal length f2 of the second lens satisfy: 1<f/f2<1.5.

14 Claims, 6 Drawing Sheets

(56) References Cited

U.S. PATENT DOCUMENTS

2012/0113504 A1 5/2012 Tanami et al.
2019/0250422 A1* 8/2019 Liu ...................... G02B 27/30

FOREIGN PATENT DOCUMENTS

| CN | 207516712 | 6/2018 |
|---|---|---|
| JP | 2012027085 A | 2/2012 |

OTHER PUBLICATIONS

First Examination Report, Intellectual Property India, dated Jul. 23, 2021, 5 pages.

* cited by examiner

PROJECTION LENS ASSEMBLY

CROSS-REFERENCE TO RELATED APPLICATIONS

This is a continuation of International Application PCT/CN2018/088685, with an international filing date of May 28, 2018, which claims the priorities and rights to Chinese Patent Application No. 201711375247.1 and Chinese Patent Application No. 201721780862.6 filed with the China National Intellectual Property Administration (CNIPA) on Dec. 19, 2017, the disclosures of which are hereby incorporated by reference in their entireties.

TECHNICAL FIELD

The present disclosure relates to a projection lens assembly, and more specifically to a projection lens assembly including two lenses.

BACKGROUND

In recent years, with the continuous improvement of the science and technology, the application of three-dimensional depth is gradually rising, and the application range of projection lens assembly is becoming wider and wider. Nowadays, due to the rapid development of chip technology and intelligent algorithm, a three-dimensional image having position depth information may be calculated by using an optical projection lens assembly to project an image to a space object and receive a signal of the image. The three-dimensional image having the depth information may be further used in the development of various depth applications such as the biometric recognition.

In general, in the conventional projection lens assembly for imaging, various aberrations are eliminated and resolution is enhanced by increasing the number of lenses. However, the increase of the number of the lenses will cause an increase of the total track length of the projection lens assembly, which is not conducive to achieving the miniaturization of the lens assembly. In addition, the general projection lens assembly having a large field-of-view also has many problems such as large distortion and poor imaging quality. Moreover, the general projection lens assembly cannot match a diffractive optical element (DOE) to accurately achieve the redistribution of a projection light beam on a target object.

SUMMARY

The present disclosure provides a projection lens assembly which may be applicable to portable electronic products and may at least or partially solve at least one of the above disadvantages in the existing technology.

According to an aspect, the present disclosure provides a projection lens assembly. The projection lens assembly includes, sequentially from an image-source side to an image side along an optical axis, a first lens having a positive refractive power, and a second lens having a positive refractive power. At least one of the first lens or the second lens may be a glass lens. A total effective focal length f of the projection lens assembly and an effective focal length f2 of the second lens may satisfy: $1<f/f2<1.5$.

In an implementation, an image-source-side surface of the first lens may be a convex surface, and an image-side surface of the first lens may be a concave surface. An image-source-side surface of the second lens may be a concave surface, and an image-side surface of the second lens may be a convex surface.

In an implementation, a smaller value $TCE_{MIN}$ of a thermal expansion coefficient of the first lens and a thermal expansion coefficient of the second lens may satisfy: $TCE_{MIN}<15\times10^{-6}/°C$.

In an implementation, half of a maximal field-of-view HFOV of the prejection lens assembly may satisfy: $0<TAN(HFOV)<0.35$.

In an implementation, a light transmittance of the projection lens assembly may be greater than 85% within a light wave band of 800 nm to 1000 nm.

In an implementation, a center thickness CT1 of the first lens on the optical axis and a center thickness CT2 of the second lens on the optical axis may satisfy: $0.6<CT1/CT2<1.2$.

In an implementation, the center thickness CT1 of the first lens on the optical axis, the center thickness CT2 of the second lens on the optical axis, and a total track length of the projection lens assembly may satisfy: $0.4<(CT1+CT2)/TTL<0.8$.

In an implementation, a radius of curvature R1 of an image-source-side surface of the first lens and a radius of curvature R4 of an image-side surface of the second lens may satisfy: $-1.2<R1/R4<-0.8$.

In an implementation, an effective semi-diameter DT11 of an image-source-side surface of the first lens and an effective semi-diameter DT22 of an image-side surface of the second lens may satisfy: $0.7<DT11/DT22<1$.

In an implementation, the total effective focal length f of the projection lens assembly, an effective focal length f1 of the first lens, and the effective focal length f2 of the second lens may satisfy: $0.5<f/(f1+f2)<0.8$.

According to an aspect, the present disclosure provides a projection lens assembly. The projection lens assembly includes, sequentially from an image-source side to an image side along an optical axis, a first lens having a positive refractive power, and a second lens having a positive refractive power. At least one of the first lens or the second lens may be a glass lens. A total effective focal length f of the projection lens assembly, an effective focal length f1 of the first lens, and an effective focal length f2 of the second lens may satisfy: $0.5<f/(f1+f2)<0.8$.

According to an aspect, the present disclosure provides a projection lens assembly. The projection lens assembly includes, sequentially from an image-source side to an image side along an optical axis, a first lens having a positive refractive power, and a second lens having a positive refractive power. At least one of the first lens or the second lens may be a glass lens. An effective semi-diameter DT11 of an image-source-side surface of the first lens and an effective semi-diameter DT22 of an image-side surface of the second lens may satisfy: $0.7<DT11/DT22<1$.

The present disclosure adopts a plurality of lenses (e.g., two lenses). By reasonably selecting the materials of the lenses, and reasonably distributing the refractive powers and the surface types of the lenses, the center thicknesses of the lenses, the spacing distances between the lenses on the optical axis, etc., the projection lens assembly has at least one of the beneficial effects such as high performance, miniaturization, low temperature drift, and high imaging quality. The above projection lens assembly can be used in conjunction with a diffractive optical element (DOE).

BRIEF DESCRIPTION OF THE DRAWINGS

By describing non-limiting implementations below in detail and in combination with the accompanying drawings, other features, objectives and advantages of the present disclosure will be more apparent. In the accompanying drawings.

DETAILED DESCRIPTION

Figure 1:
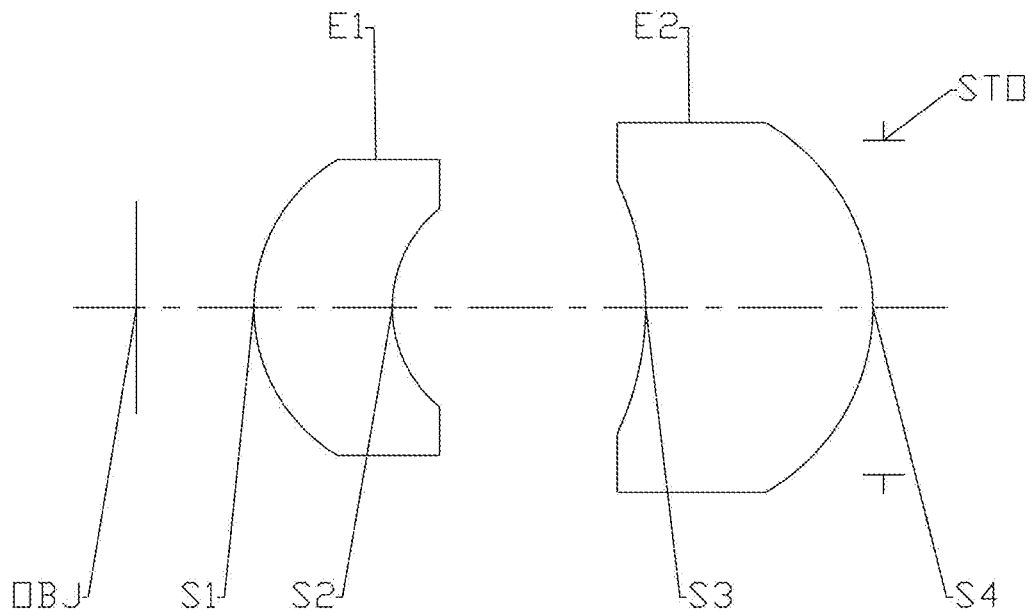
FIG. 1 is a schematic structural diagram illustrating a projection lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure rather than a limitation to the scope of the present disclosure in any way. Throughout the specification, the same reference numerals designate the same elements. The expression "and/or" includes any and all combinations of one or more of the associated listed items.

It should be noted that in the specification, the expressions such as "first" and "second" are only used to distinguish one feature from another, rather than represent any limitations to the features. Thus, without departing from the teachings of the present disclosure, the first lens discussed below may also be referred to as the second lens, and the second lens may also be referred to as the first lens.

In the accompanying drawings, the thicknesses, sizes and shapes of the lenses have been slightly exaggerated for the convenience of explanation.

Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and a position of the convex surface is not defined, it indicates that the surface of the lens is a convex surface at least in the paraxial area; and if a surface of a lens is a concave surface and a position of the concave surface is not defined, it indicates that the surface of the lens is a concave surface at least in the paraxial area. The surface closest to the image-source side in each lens is referred to as the image-source-side surface, and the surface closest to the image side in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (i.e., those defined in commonly used dictionaries) should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Features, principles, and other aspects of the present disclosure are described below in detail.

A projection lens assembly according to exemplary implementations of the present disclosure may include, for example, two lenses (i.e., a first lens and a second lens) having refractive powers. The two lenses are arranged in sequence from an image-source side to an image side along an optical axis.

In the exemplary implementations, the first lens may have a positive refractive power. The second lens may have a positive refractive power. Reasonably distributing the refractive power and the surface type of each lens is conducive to improving the performance of the projection lens assembly, and is further conducive to reducing the total length of the lens assembly, which ensures the miniaturization of the lens assembly.

In the exemplary implementations, an image-source-side surface of the first lens may be a convex surface, and an image-side surface of the first lens may be a concave surface. An image-source-side surface of the second lens may be a concave surface, and an image-side surface of the second lens may be a convex surface. Reasonably distributing the surface type of each lens is conducive to realizing the effects of high performance and low sensitivity of the lens assembly.

In the exemplary implementations, the projection lens assembly of the present disclosure may satisfy the conditional expression $TCE_{MIN} < 15 \times 10^{-6}/^\circ C$. Here, $TCE_{MIN}$ is the smaller of the thermal expansion coefficient of the first lens and the thermal expansion coefficient of the second lens. More specifically, $TCE_{MIN}$ may further satisfy: $0.00 \times 10^{-6}/^\circ C. \leq TCE_{MIN} 9.50 \times 10^{-6}/^\circ C$. At least one of the first lens or the second lens is a glass lens. Reasonable use of the glass lens is conducive to reducing a temperature drift.

In the exemplary implementations, the projection lens assembly of the present disclosure may satisfy the conditional expression 0<TAN(HFOV)<0.35. Here, HFOV is the half of the maximal field-of-view of the prejection lens assembly. More specifically, HFOV may further satisfy: 0.1<TAN(HFOV)<0.2, for example, 0.15≤TAN(HFOV) ≤0.16. It is conducive to reducing the size effect of the image source at the image side and improving the optical performance of the projection lens assembly.

In the exemplary implementations, the projection lens assembly of the present disclosure may satisfy the conditional expression 0.6<CT1/CT2<1.2. Here, CT1 is the center thickness of the first lens on the optical axis, and CT2 is the center thickness of the second lens on the optical axis. More specifically, CT1 and CT2 may further satisfy: 0.61≤CT1/CT2≤1.06. Reasonably distributing the center thickness of the first lens and the center thickness of the second lens is conducive to ensuring that the lens assembly has a short total length, thereby achieving the miniaturization characteristics.

In the exemplary implementations, the projection lens assembly of the present disclosure may satisfy the conditional expression 0.4<(CT1+CT2)/TTL<0.8. Here, CT1 is the center thickness of the first lens on the optical axis, CT2 is the center thickness of the second lens on the optical axis, and TTL is the total track length of the projection lens assembly (i.e., the distance from the image source to the center of the image-side surface of the second lens on the optical axis). More specifically, CT1, CT2, and TTL may further satisfy: 0.50≤(CT1+CT2)/TTL≤0.76. Satisfying the conditional expression 0.4<(CT1+CT2)/TTL<0.8 is conducive to achieving the effect of the miniaturization of the lens assembly.

In the exemplary implementations, the projection lens assembly of the present disclosure may satisfy the conditional expression −1.2<R1/R4<−0.8. Here, R1 is the radius of curvature of the image-source-side surface of the first lens, and R4 is the radius of curvature of the image-side surface of the second lens. More specifically, R1 and R4 may further satisfy: −1.15≤R1/R4≤−0.82. Reasonably distributing the radius of curvature of the first lens and the radius of curvature of the second lens is conducive to reducing the sensitivity of the lens assembly.

In the exemplary implementations, the projection lens assembly of the present disclosure may satisfy the conditional expression 0.7<DT11/DT22<1. Here, DT11 is the effective semi-diameter of the image-source-side surface of the first lens, and DT22 is the effective semi-diameter of the image-side surface of the second lens. More specifically, DT11 and DT22 may further satisfy: 0.7<DT11/DT22<0.9, for example, 0.78DT11/DT220.83. Satisfying the conditional expression 0.7<DT11/DT22<1 is conducive to reducing the size effect of the image source at the image side, and improving the optical performance of the projection lens assembly. Reasonably distributing DT11 and DT22 is also conducive to avoiding the reduction of the imaging quality caused by the excessive bending of light.

In the exemplary implementations, a light transmittance of the projection lens assembly of the present disclosure is greater than 85% within a light wave band of 800 nm to 1000 nm. Such a setting is conducive to improving the transmittance of near-infrared light passing through the projection lens assembly, thereby obtaining a near-infrared projection image having higher-brightness.

In the exemplary implementations, the projection lens assembly of the present disclosure may satisfy the conditional expression 1<f/f2<1.5. Here, f is the total effective focal length of the projection lens assembly, and f2 is the effective focal length of the second lens. More specifically, f and f2 may further satisfy: 1.11≤f/f2≤1.48. Reasonably distributing the refractive power of the second lens is conducive to reducing the temperature drift and improving the optical performance of the lens assembly.

In the exemplary implementations, the projection lens assembly of the present disclosure may satisfy the conditional expression 0.5<f/(f1+f2)<0.8. Here, f is the total effective focal length of the projection lens assembly, f1 is the effective focal length of the first lens, and f2 is the effective focal length of the second lens. More specifically, f, f1 and f2 may further satisfy: 0.55≤f/(f1+f2)≤0.66. Reasonably distributing the refractive power of the first lens and the refractive power of the second lens is conducive to achieving the high performance of the lens assembly.

In the exemplary implementations, the above projection lens assembly may further include at least one diaphragm, to improve the imaging quality of the lens assembly. The diaphragm may be disposed at any position as needed. For example, the diaphragm may be disposed between the second lens and the image side.

Alternatively, the above projection lens assembly may further include other well-known optical projection elements such as prisms and field lenses. The main difference between the general lens assembly and the projection lens assembly lies in that, the light of the general camera lens assembly forms one image plane from an object side to an image side, and the light of the general projection lens assembly, from an image-source side to an image side, enlarges an image plane and projects the image plane up to the projection plane. The amount of light entering the general projection lens assembly is controlled by an object-side numerical aperture and the diaphragm of the lens assembly. The projection lens assembly according to the above implementations of the present disclosure may use, for example, two lenses. By reasonably selecting the materials of the lenses, and reasonably distributing the refractive powers and the surface types of the lenses, the center thicknesses of the lenses, the spacing distances between the lenses on the axis, etc., the projection lens assembly has beneficial effects such as high performance, miniaturization, low temperature drift, and high imaging quality.

Figure 11:
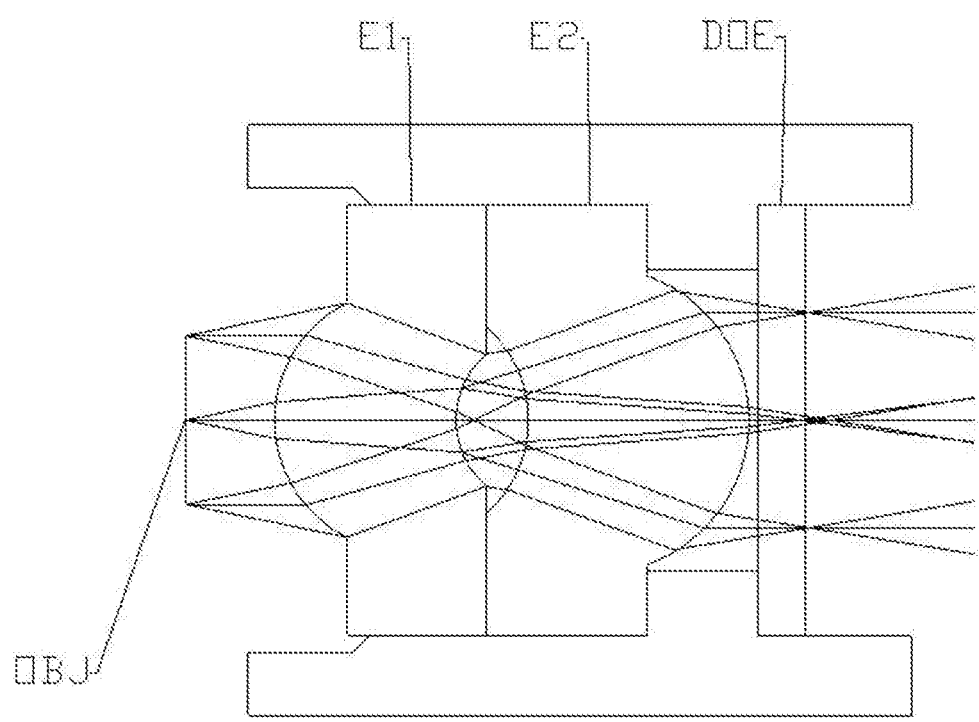
FIG. 11 is a schematic structural diagram illustrating a projection lens assembly according to the present disclosure that is used in conjunction with a diffractive element.

The projection lens assembly according to the present disclosure may be used as a speckle projection lens assembly to be applied to the field of depth detection. As shown in FIG. 11, when a depth detection is performed on a target object in a space using the projection lens assembly of the present disclosure, the light emitted by the infrared laser diode (LD) or the vertical cavity surface emitting laser (VCSEL) is first amplified through a speckle of the projection lens assembly. Next, the light passes through a diffractive optical element (DOE). Then, the light is projected toward the direction of the target object. After the projection light beam passes through the diffractive optical element (DOE), the redistribution of the projection image on the target object may be achieved. Afterwards, the three-dimensional image having the position depth information of the target object may be calculated by capturing the information of the image projected onto the target object by any well-known camera lens assembly (not shown). The projection lens assembly according to the present disclosure can be used in conjunction with the diffractive optical element (DOE), thereby accurately achieving the redistribution of the projection light beam on the target object.

In the implementations of the present disclosure, at least one of the surfaces of the lenses is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration and the astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the projection lens assembly without departing from the technical solution claimed by the present disclosure. For example, although the projection lens assembly having two lenses is described as an example in the implementations, the projection lens assembly is not limited to include two lenses. If desired, the projection lens assembly may also include other numbers of lenses.

Specific embodiments of the projection lens assembly that may be applied to the above implementations are further described below with reference to the accompanying drawings.

Embodiment 1

A projection lens assembly according to Embodiment 1 of the present disclosure is described below with reference to FIGS. 1-2. FIG. 1 is a schematic structural diagram illustrating the projection lens assembly according to Embodiment 1 of the present disclosure.

As shown in FIG. 1, the projection lens assembly according to the exemplary implementations of the present disclosure includes, sequentially from an image-source side to an image side along an optical axis, a first lens E1, a second lens E2, and a diaphragm STO.

The first lens E1 has a positive refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a concave surface, and an image-side surface S4 of the second lens E2 is a convex surface. A light transmittance of the projection lens assembly is greater than 85% within a light wave band of about 800 nm to about 1000 nm. Light from an image source sequentially passes through the surfaces S1-S4 and finally forms an image on, for example, the projection plane of a projection screen (not shown).

Table 1 shows the surface type, the radius of curvature, the thickness, the material and the conic coefficient of each lens of the projection lens assembly in Embodiment 1. The radius of curvature and the thickness are both shown in millimeters (mm).

TABLE 1

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 0.8018 | 0.6483 | 1.79 | 24.1 | 0.0265 |
| S2 | aspheric | 0.7373 | 1.1871 | | | 0.3806 |
| S3 | aspheric | −2.1719 | 1.0644 | 1.49 | 81.6 | 11.6217 |
| S4 | aspheric | −0.9717 | 0.0500 | | | 0.0213 |
| STO | spherical | infinite | 1000.0000 | | | |
| S5 | spherical | infinite | | | | |

As may be obtained from Table 1, the image-source-side surface S1, the image-side surface S2 of the first lens E1, the image-source-side surface S3 and the image-side surface S4 of the second lens E2 are aspheric surfaces. In this embodiment, the surface type x of each of the aspheric surfaces may be defined using, but not limited to, the following formula:

$$x = \frac{ch^2}{1+\sqrt{1-(k+1)c^2h^2}} + \sum A_i h^i. \tag{1}$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in Table 1); and $A_i$ is the correction coefficient of the $i^{th}$ order of the aspheric surface. Table 2 below shows the high-order coefficients $A_4$, $A_6$, $A_8$, $A_{10}$, $A_{12}$, $A_{14}$, and $A_{16}$ applicable to the aspheric surfaces S1-S4 in Embodiment 1.

TABLE 2

| surface number | A4 | A6 | A8 | A10 | A12 | A14 | A16 |
|---|---|---|---|---|---|---|---|
| S1 | 6.6779E−02 | −2.1533E−01 | 6.7938E−01 | −3.4057E+00 | 6.8954E+00 | −3.9692E+00 | −4.5296E+00 |
| S2 | 6.7146E−01 | −6.3408E−01 | 2.5150E+01 | −1.3173E+02 | 6.3999E+01 | 2.8529E+03 | −8.0409E+03 |
| S3 | −6.6496E−02 | −1.0255E−01 | 1.5182E+00 | −1.6356E+01 | 8.5757E+01 | −2.2034E+02 | 2.3336E+02 |
| S4 | 2.1740E−02 | 2.1568E−02 | 8.1556E−04 | 7.4412E−04 | 1.1502E−01 | −1.5533E−01 | 1.1233E−01 |

Table 3 shows the total effective focal length f of the projection lens assembly in Embodiment 1, the effective focal lengths f1-f2 of the lenses, the total track length TTL of the projection lens assembly (i.e., the distance from the image source OBJ to the center of the image-side surface S4 of the second lens E2 on the optical axis), the half of the maximal field-of-view HFOV of the prejection lens assembly, and the object-side numerical aperture NA of the prejection lens assembly.

TABLE 3

| | parameter | | | | | |
|---|---|---|---|---|---|---|
| | f (mm) | f1 (mm) | f2 (mm) | TTL (mm) | HFOV (°) | NA |
| numerical value | 3.39 | 3.37 | 2.77 | 3.45 | 8.4 | 0.20 |

The projection lens assembly in Embodiment 1 satisfies at least one of the following conditions.

TAN(HFOV)=0.15, wherein HFOV is the half of the maximal field-of-view of the prejection lens assembly.

CT1/CT2=0.61, wherein CT1 is the center thickness of the first lens E1 on the optical axis, and CT2 is the center thickness of the second lens E2 on the optical axis.

(CT1+CT2)/TTL=0.50, wherein CT1 is the center thickness of the first lens E1 on the optical axis, CT2 is the center thickness of the second lens E2 on the optical axis, and TTL is the total track length of the projection lens assembly.

R1/R4=−0.83, wherein R1 is the radius of curvature of the image-source-side surface S1 of the first lens E1, and R4 is the radius of curvature of the image-side surface S4 of the second lens E2.

DT11/DT22=0.80, wherein DT11 is the effective semi-diameter of the image-source-side surface S1 of the first lens E1, and DT22 is the effective semi-diameter of the image-side surface S4 of the second lens E2.

f/f2=1.22, wherein f is the total effective focal length of the projection lens assembly, and f2 is the effective focal length of the second lens E2.

f/(f1+f2)=0.55, wherein f is the total effective focal length of the projection lens assembly, f1 is the effective focal length of the first lens E1, and f2 is the effective focal length of the second lens E2.

$TCE_{MIN}$=0.00×10$^{-6}$/° C., wherein $TCE_{MIN}$ is the smaller of the thermal expansion coefficient of the first lens E1 and the thermal expansion coefficient of the second lens E2.

Figure 2:
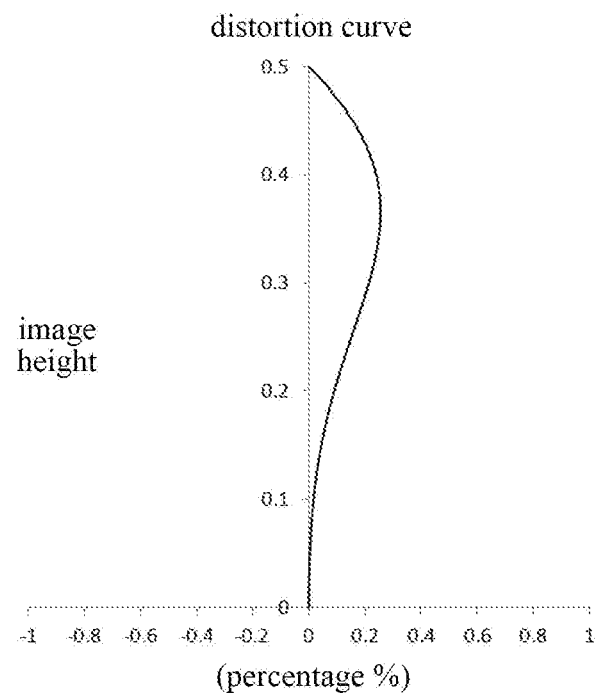
FIG. 2 illustrates a distortion curve of the projection lens assembly according to Embodiment 1.

FIG. 2 illustrates the distortion curve of the projection lens assembly according to Embodiment 1, representing amounts of distortion at different viewing angles. It can be seen from FIG. 2 that the projection lens assembly according to Embodiment 1 can achieve a good imaging quality.

Embodiment 2

Figure 3:
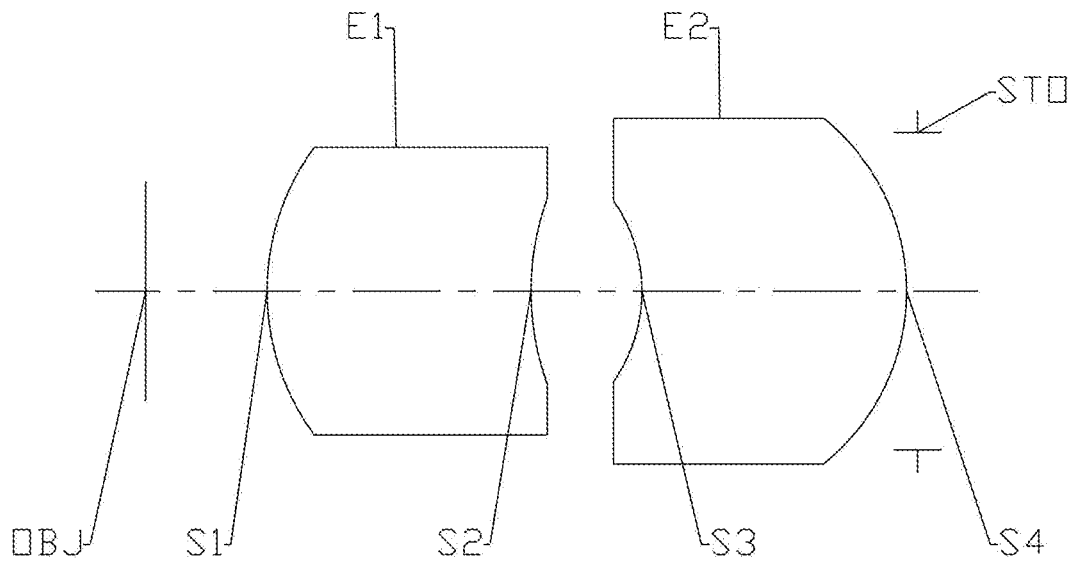
FIG. 3 is a schematic structural diagram illustrating a projection lens assembly according to Embodiment 2 of the present disclosure.

A projection lens assembly according to Embodiment 2 of the present disclosure is described below with reference to FIGS. 3-4. In this embodiment and the following embodiments, for the purpose of brevity, the description of parts similar to those in Embodiment 1 will be omitted. FIG. 3 is a schematic structural diagram illustrating the projection lens assembly according to Embodiment 2 of the present disclosure.

As shown in FIG. 3, the projection lens assembly according to the exemplary implementations of the present disclosure includes, sequentially from an image-source side to an image side along an optical axis, a first lens E1, a second lens E2, and a diaphragm STO.

The first lens E1 has a positive refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a concave surface, and an image-side surface S4 of the second lens E2 is a convex surface. A light transmittance of the projection lens assembly is greater than 85% within a light wave band of about 800 nm to about 1000 nm. Light from an image source sequentially passes through the surfaces S1-S4 and finally forms an image on, for example, the projection plane of a projection screen (not shown).

Table 4 shows the surface type, the radius of curvature, the thickness, the material and the conic coefficient of each lens of the projection lens assembly in Embodiment 2. The radius of curvature and the thickness are both shown in millimeters (mm).

TABLE 4

| | | | | material | | |
|---|---|---|---|---|---|---|
| surface number | surface type | radius of curvature | thickness | refractive index | abbe number | conic coefficient |
| OBJ | spherical | infinite | 0.5500 | | | |
| S1 | aspheric | 1.1529 | 1.1969 | 1.79 | 24.1 | 1.6149 |
| S2 | aspheric | 1.5780 | 0.5031 | | | −4.5433 |
| S3 | aspheric | −0.9235 | 1.2000 | 1.76 | 49.5 | 2.8479 |
| S4 | aspheric | −1.0068 | 0.0500 | | | −0.0591 |
| STO | spherical | infinite | 1000.0000 | | | |
| S5 | spherical | infinite | | | | |

As may be obtained from Table 4, in Embodiment 2, the image-source-side surface S1, the image-side surface S2 of the first lens E1, the image-source-side surface S3 and the image-side surface S4 of the second lens E2 are aspheric surfaces. Table 5 shows the high-order coefficients applicable to each aspheric surface in Embodiment 2. The surface type of each aspheric surface may be defined by the formula (1) given in Embodiment 1.

TABLE 5

| surface number | A4 | A6 | A8 | A10 | A12 | A14 | A16 |
|---|---|---|---|---|---|---|---|
| S1 | −6.6061E−02 | 1.0707E−01 | −5.2668E+00 | 3.3949E+01 | −1.2315E+02 | 2.2354E+02 | −1.6954E+02 |
| S2 | 6.4678E−01 | −3.7800E+00 | 1.1027E+02 | −1.6006E+03 | 1.2745E+04 | −5.2495E+04 | 8.7013E+04 |
| S3 | −4.7767E−02 | −2.3954E−01 | 3.9808E−01 | −1.7446E+01 | 1.4517E+02 | −7.7484E+02 | 6.7842E+01 |
| S4 | −2.8044E−03 | 1.5669E−03 | −3.8248E−02 | 1.3579E−01 | −2.9681E−01 | 3.1658E−01 | −1.3674E−01 |

Table 6 shows the total effective focal length f of the projection lens assembly in Embodiment 2, the effective focal lengths f1-f2 of the lenses, the total track length TTL of the projection lens assembly, the half of the maximal field-of-view HFOV of the prejection lens assembly, and the object-side numerical aperture NA of the prejection lens assembly.

TABLE 6

| | parameter | | | | |
|---|---|---|---|---|---|
| f (mm) | f1 (mm) | f2 (mm) | TTL (mm) | HFOV (°) | NA |
| numerical value 3.13 | 2.41 | 2.81 | 3.45 | 9.1 | 0.20 |

Figure 4:
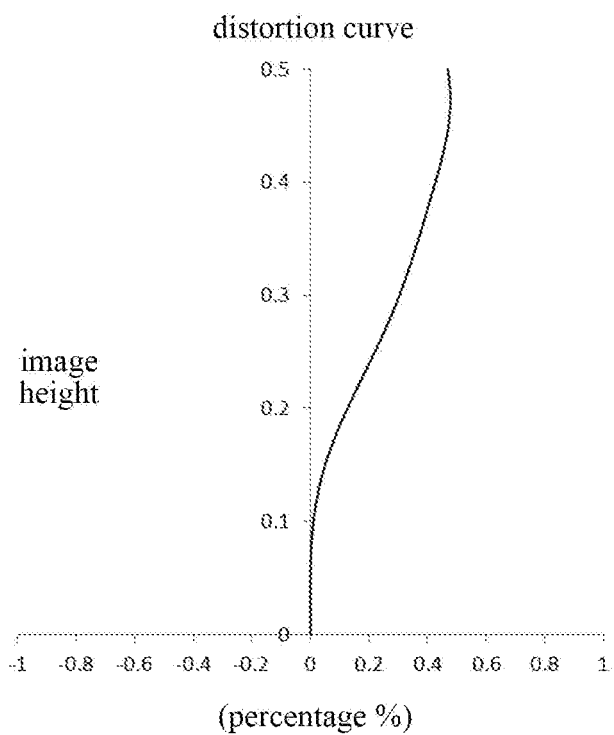
FIG. 4 illustrates a distortion curve of the projection lens assembly according to Embodiment 2.

FIG. 4 illustrates the distortion curve of the projection lens assembly according to Embodiment 2, representing amounts of distortion at different viewing angles. It can be seen from FIG. 4 that the projection lens assembly according to Embodiment 2 can achieve a good imaging quality.

TABLE 7

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 0.9442 | 1.1414 | 1.79 | 24.1 | 0.1478 |
| S2 | aspheric | 0.7524 | 0.5309 | | | 0.7262 |
| S3 | aspheric | −2.1099 | 1.2277 | 1.53 | 55.8 | 15.4980 |
| S4 | aspheric | −0.8889 | 1000.0500 | | | −0.0863 |
| S5 | spherical | infinite | | | | |

As may be obtained from Table 7, in Embodiment 3, the image-source-side surface S1, the image-side surface S2 of the first lens E1, the image-source-side surface S3 and the image-side surface S4 of the second lens E2 are aspheric surfaces. Table 8 shows the high-order coefficients applicable to each aspheric surface in Embodiment 3. The surface type of each aspheric surface may be defined by the formula (1) given in Embodiment 1.

TABLE 8

| surface number | A4 | A6 | A8 | A10 | A12 | A14 | A16 |
|---|---|---|---|---|---|---|---|
| S1 | −5.4910E−02 | 7.1496E−03 | −4.8775E−01 | 4.6674E−01 | 2.2280E+00 | −7.8840E+00 | 6.5804E+00 |
| S2 | 5.7693E−01 | 7.5933E−01 | 1.7444E+01 | −1.9770E+02 | 1.6471E+03 | −4.8654E+03 | 2.1756E+03 |
| S3 | 1.7187E−03 | 1.8159E−01 | 5.0055E−01 | −1.0146E+00 | 2.9928E+01 | −9.7953E+01 | 3.1718E+02 |
| S4 | 2.3711E−02 | 1.8801E−02 | 6.6387E−02 | −1.7402E−01 | 4.7586E−01 | −4.8873E−01 | 2.6749E−01 |

Embodiment 3

Figure 5:
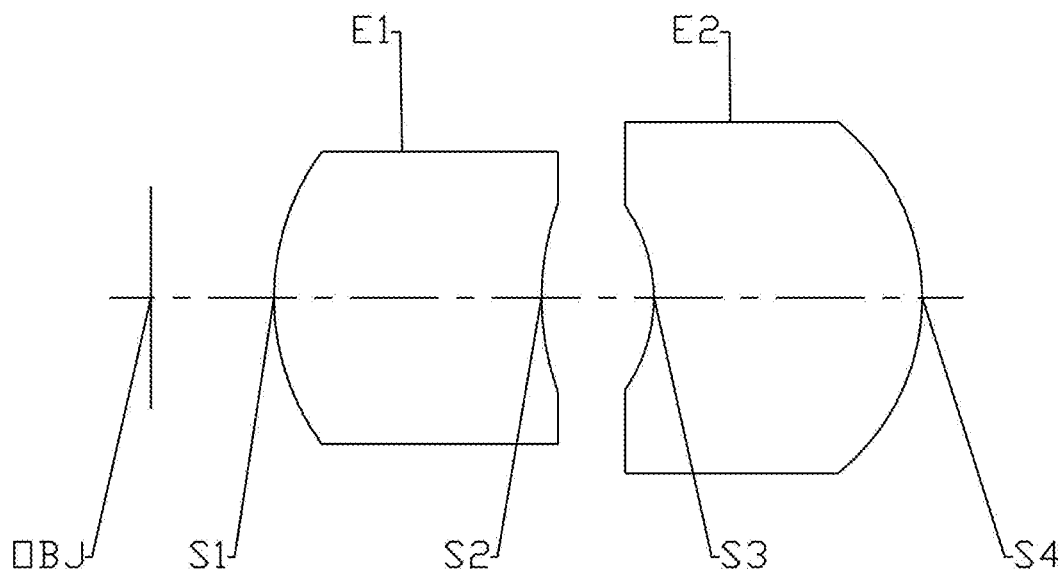
FIG. 5 is a schematic structural diagram illustrating a projection lens assembly according to Embodiment 3 of the present disclosure.

A projection lens assembly according to Embodiment 3 of the present disclosure is described below with reference to FIGS. 5-6. FIG. 5 is a schematic structural diagram illustrating the projection lens assembly according to Embodiment 3 of the present disclosure.

As shown in FIG. 5, the projection lens assembly according to the exemplary implementations of the present disclosure includes, sequentially from an image-source side to an image side along an optical axis, a first lens E1, a second lens E2, and a diaphragm STO.

The first lens E1 has a positive refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a concave surface, and an image-side surface S4 of the second lens E2 is a convex surface. A light transmittance of the projection lens assembly is greater than 85% within a light wave band of about 800 nm to about 1000 nm. Light from an image source sequentially passes through the surfaces S1-S4 and finally forms an image on, for example, the projection plane of a projection screen (not shown).

Table 7 shows the surface type, the radius of curvature, the thickness, the material and the conic coefficient of each lens of the projection lens assembly in Embodiment 3. The radius of curvature and the thickness are both shown in millimeters (mm).

Table 9 shows the total effective focal length f of the projection lens assembly in Embodiment 3, the effective focal lengths f1-f2 of the lenses, the total track length TTL of the projection lens assembly, the half of the maximal field-of-view HFOV of the prejection lens assembly, and the object-side numerical aperture NA of the prejection lens assembly.

TABLE 9

| | parameter | | | | |
|---|---|---|---|---|---|
| f (mm) | f1 (mm) | f2 (mm) | TTL (mm) | HFOV (°) | NA |
| numerical value 3.20 | 2.87 | 2.17 | 3.45 | 8.9 | 0.20 |

Figure 6:
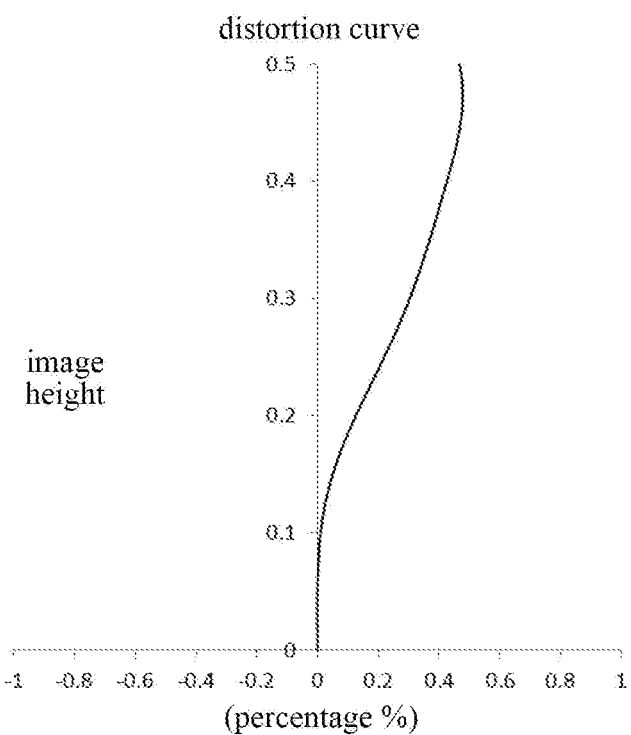
FIG. 6 illustrates a distortion curve of the projection lens assembly according to Embodiment 3.

FIG. 6 illustrates the distortion curve of the projection lens assembly according to Embodiment 3, representing amounts of distortion at different viewing angles. It can be seen from FIG. 6 that the projection lens assembly according to Embodiment 3 can achieve a good imaging quality.

Embodiment 4

Figure 7:
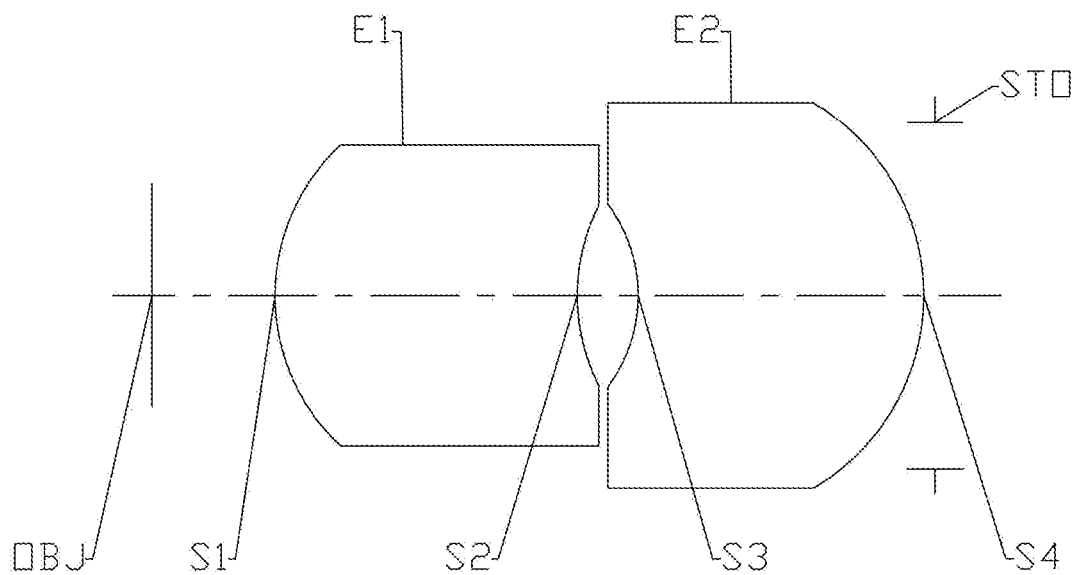
FIG. 7 is a schematic structural diagram illustrating a projection lens assembly according to Embodiment 4 of the present disclosure.

A projection lens assembly according to Embodiment 4 of the present disclosure is described below with reference to FIGS. 7-8. FIG. 7 is a schematic structural diagram illustrating the projection lens assembly according to Embodiment 4 of the present disclosure.

As shown in FIG. 7, the projection lens assembly according to the exemplary implementations of the present disclosure includes, sequentially from an image-source side to an image side along an optical axis, a first lens E1, a second lens E2, and a diaphragm STO.

The first lens E1 has a positive refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a concave surface, and an image-side surface S4 of the second lens E2 is a convex surface. A light transmittance of the projection lens assembly is greater than 85% within a light wave band of about 800 nm to about 1000 nm. Light from an image source sequentially passes through the surfaces S1-S4 and finally forms an image on, for example, the projection plane of a projection screen (not shown).

Table 10 shows the surface type, the radius of curvature, the thickness, the material and the conic coefficient of each lens of the projection lens assembly in Embodiment 4. The radius of curvature and the thickness are both shown in millimeters (mm).

TABLE 10

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 0.9845 | 1.3511 | 1.53 | 55.8 | 0.7830 |
| S2 | aspheric | 1.4806 | 0.2723 | | | 5.2408 |
| S3 | aspheric | −0.8439 | 1.2766 | 1.72 | 54.0 | 2.7881 |
| S4 | aspheric | −0.9779 | 0.0500 | | | −0.0511 |
| STO | spherical | infinite | 1000.0000 | | | |
| S5 | spherical | infinite | | | | |

As may be obtained from Table 10, in Embodiment 4, the image-source-side surface S1, the image-side surface S2 of the first lens E1, the image-source-side surface S3 and the image-side surface S4 of the second lens E2 are aspheric surfaces. Table 11 shows the high-order coefficients applicable to each aspheric surface in Embodiment 4. The surface type of each aspheric surface may be defined by the formula (1) given in Embodiment 1.

TABLE 11

| surface number | A4 | A6 | A8 | A10 | A12 | A14 | A16 |
|---|---|---|---|---|---|---|---|
| S1 | 1.1124E−01 | −4.3057E−01 | −8.1028E−01 | 9.9211E+00 | −4.6702E+01 | 9.6371E+01 | −8.1338E+01 |
| S2 | 6.5729E−01 | −9.8660E−01 | 5.9240E+01 | −6.2664E+02 | 4.4169E+03 | −1.5872E+04 | 3.2887E+04 |
| S3 | 1.1759E−01 | −3.0969E−01 | 2.4760E+01 | −3.0982E+02 | 2.6300E+03 | −1.1458E+04 | 2.5222E+04 |
| S4 | 4.1869E−03 | −2.0027E−03 | 5.8219E−02 | −2.6558E−01 | 6.4642E−01 | −7.6412E−01 | 3.5579E−01 |

Table 12 shows the total effective focal length f of the projection lens assembly in Embodiment 4, the effective focal lengths f1-f2 of the lenses, the total track length TTL of the projection lens assembly, the half of the maximal field-of-view HFOV of the prejection lens assembly, and the object-side numerical aperture NA of the prejection lens assembly.

TABLE 12

| | parameter | | | | | |
|---|---|---|---|---|---|---|
| | f (mm) | f1 (mm) | f2 (mm) | TTL (mm) | HFOV (°) | NA |
| numerical value | 3.25 | 2.88 | 2.89 | 3.45 | 9.0 | 0.20 |

Figure 8:
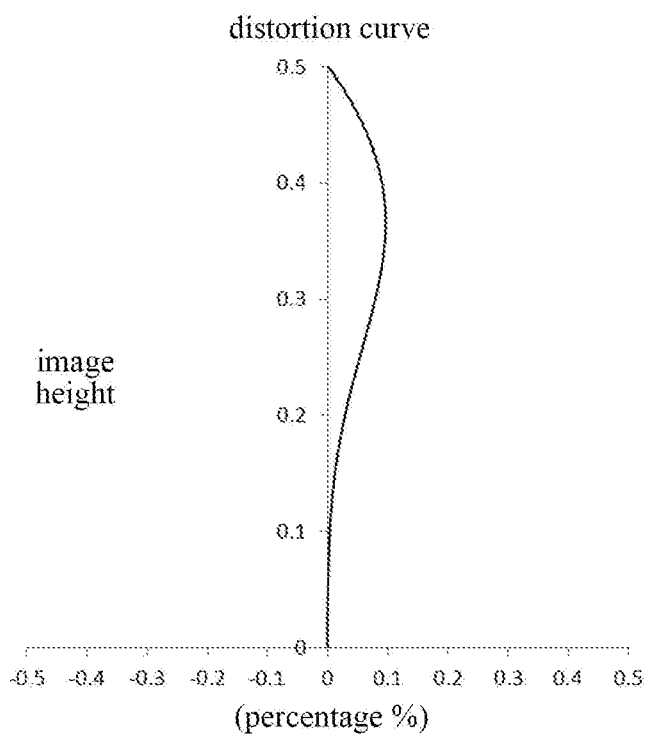
FIG. 8 illustrates a distortion curve of the projection lens assembly according to Embodiment 4.

FIG. 8 illustrates the distortion curve of the projection lens assembly according to Embodiment 4, representing amounts of distortion at different viewing angles. It can be seen from FIG. 8 that the projection lens assembly according to Embodiment 4 can achieve a good imaging quality.

Embodiment 5

Figure 9:
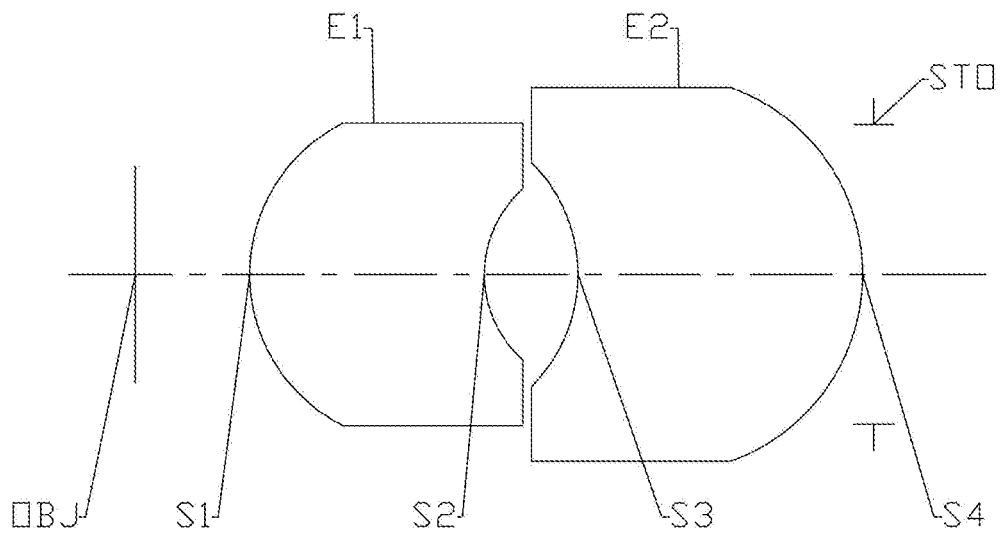
FIG. 9 is a schematic structural diagram illustrating a projection lens assembly according to Embodiment 5 of the present disclosure.

A projection lens assembly according to Embodiment 5 of the present disclosure is described below with reference to FIGS. 9-10. FIG. 9 is a schematic structural diagram illustrating the projection lens assembly according to Embodiment 5 of the present disclosure.

As shown in FIG. 9, the projection lens assembly according to the exemplary implementations of the present disclosure includes, sequentially from an image-source side to an image side along an optical axis, a first lens E1, a second lens E2, and a diaphragm STO.

The first lens E1 has a positive refractive power, an image-source-side surface S1 of the first lens E1 is a convex surface, and an image-side surface S2 of the first lens E1 is a concave surface. The second lens E2 has a positive refractive power, an image-source-side surface S3 of the second lens E2 is a concave surface, and an image-side surface S4 of the second lens E2 is a convex surface. A light transmittance of the projection lens assembly is greater than 85% within a light wave band of about 800 nm to about 1000 nm. Light from an image source sequentially passes through the surfaces S1-S4 and finally forms an image on, for example, the projection plane of a projection screen (not shown).

Table 13 shows the surface type, the radius of curvature, the thickness, the material and the conic coefficient of each lens of the projection lens assembly in Embodiment 5. The curvature and the thickness are both shown in millimeters (mm).

TABLE 13

| surface number | surface type | radius of curvature | thickness | material refractive index | abbe number | conic coefficient |
|---|---|---|---|---|---|---|
| OBJ | spherical | infinite | 0.5500 | | | |
| S1 | aspheric | 0.7176 | 1.1292 | 1.53 | 55.8 | −0.1470 |
| S2 | aspheric | 0.7276 | 0.4505 | | | −0.0226 |
| S3 | aspheric | −1.3104 | 1.3695 | 1.51 | 63.5 | −44.3554 |
| S4 | aspheric | −0.8798 | 0.0530 | | | −0.2728 |
| STO | spherical | infinite | 10000.0000 | | | |
| S5 | spherical | infinite | | | | |

As may be obtained from Table 13, in Embodiment 5, the image-source-side surface S1, the image-side surface S2 of the first lens E1, the image-source-side surface S3 and the image-side surface S4 of the second lens E2 are aspheric surfaces. Table 14 shows the high-order coefficients applicable to each aspheric surface in Embodiment 5. The surface type of each aspheric surface may be defined by the formula (1) given in Embodiment 1.

TABLE 14

| surface number | A4 | A6 | A8 | A10 | A12 | A14 | A16 |
|---|---|---|---|---|---|---|---|
| S1 | −1.6234E−01 | 8.7888E−01 | −8.6559E+00 | 3.9419E+01 | −1.0705E+02 | 1.5614E+02 | −9.8248E+01 |
| S2 | 9.4369E−01 | 4.5172E+00 | −2.5322E+01 | 2.4299E+02 | −1.7173E+02 | 0.0000E+00 | 0.0000E+00 |
| S3 | −2.8546E+00 | 2.6308E+01 | −2.6771E+02 | 1.6990E+03 | −5.8668E+03 | 7.7236E+03 | 0.0000E+00 |
| S4 | −5.8240E−03 | −9.0683E−02 | 6.7866E−01 | −3.0133E+00 | 7.0028E+00 | −8.3009E+00 | 3.8635E+00 |

Table 15 shows the total effective focal length f of the projection lens assembly in Embodiment 5, the effective focal lengths f1-f2 of the lenses, the total track length TTL of the projection lens assembly, the half of the maximal field-of-view HFOV of the prejection lens assembly, and the object-side numerical aperture NA of the prejection lens assembly.

TABLE 15

| | parameter | | | | | |
|---|---|---|---|---|---|---|
| | f (mm) | f1 (mm) | f2 (mm) | TTL (mm) | HFOV (°) | NA |
| numerical value | 3.33 | 2.48 | 2.54 | 3.50 | 9.0 | 0.20 |

Figure 10:
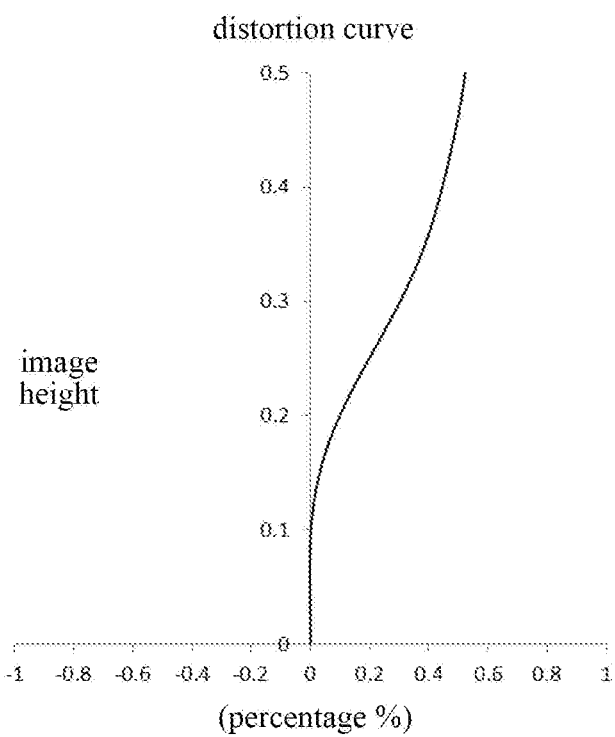
FIG. 10 illustrates a distortion curve of the projection lens assembly according to Embodiment 5.

FIG. 10 illustrates the distortion curve of the projection lens assembly according to Embodiment 5, representing amounts of distortion at different viewing angles. It can be seen from FIG. 10 that the projection lens assembly according to Embodiment 5 can achieve a good imaging quality.

To sum up, Embodiments 1-5 respectively satisfy the relationships shown in Table 16 below.

TABLE 16

| | Embodiment | | | | |
|---|---|---|---|---|---|
| Conditional Expression | 1 | 2 | 3 | 4 | 5 |
| TAN(HFOV) | 0.15 | 0.16 | 0.16 | 0.16 | 0.16 |
| CT1/CT2 | 0.61 | 1.00 | 0.93 | 1.06 | 0.82 |
| (CT1 + CT2)/TTL | 0.50 | 0.69 | 0.69 | 0.76 | 0.71 |
| R1/R4 | −0.83 | −1.15 | −1.06 | −1.01 | −0.82 |
| DT11/DT22 | 0.80 | 0.83 | 0.83 | 0.78 | 0.81 |
| f/f2 | 1.22 | 1.11 | 1.48 | 1.12 | 1.31 |
| f/(f1 + f2) | 0.55 | 0.60 | 0.64 | 0.56 | 0.66 |
| $TCE_{MIN}$(×10−6/° C.) | 0.00 | 9.50 | 7.60 | 9.50 | 6.10 |

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the features as disclosed in the present disclosure with (but not limited to) technical features with similar functions.

What is claimed is:

1. A projection lens assembly comprising, sequentially from an image-source side to an image side along an optical axis,
a first lens having a positive refractive power; and
a second lens having a positive refractive power,
wherein at least one of the first lens or the second lens is a glass lens, and
a total effective focal length f of the projection lens assembly and an effective focal length f2 of the second lens satisfy: 1<f/f2<1.5,
wherein a radius of curvature R1 of an image-source-side surface of the first lens and a radius of curvature R4 of an image-side surface of the second lens satisfy: −1.2<R1/R4<−0.8, and
wherein an effective semi-diameter DT11 of the image-source-side surface of the first lens and an effective semi-diameter DT22 of the image-side surface of the second lens satisfy: 0.7<DT11/DT22<1.

2. The projection lens assembly according to claim 1, wherein the image-source-side surface of the first lens is a convex surface, and an image-side surface of the first lens is a concave surface.

3. The projection lens assembly according to claim 1, wherein an image-source-side surface of the second lens is a concave surface, and the image-side surface of the second lens is a convex surface.

4. The projection lens assembly according to claim 1, wherein half of a maximal field-of-view HFOV of the prejection lens assembly satisfies: 0<TAN(HFOV)<0.35.

5. The projection lens assembly according to claim 1, wherein a light transmittance of the projection lens assembly is greater than 85% within a light wave band of 800 nm to 1000 nm.

6. The projection lens assembly according to claim 1, wherein a center thickness CT1 of the first lens on the optical axis and a center thickness CT2 of the second lens on the optical axis satisfy: 0.6<CT1/CT2<1.2.

7. The projection lens assembly according to claim 1, wherein a center thickness CT1 of the first lens on the optical axis, a center thickness CT2 of the second lens on the optical axis, and a total track length of the projection lens assembly satisfy: 0.4<(CT1+CT2)/TTL<0.8.

8. The projection lens assembly according to claim 1, wherein the total effective focal length f of the projection lens assembly, an effective focal length f1 of the first lens, and the effective focal length f2 of the second lens satisfy: 0.5<f/(f1+f2)<0.8.

9. A projection lens assembly comprising, sequentially from an image-source side to an image side along an optical axis,
a first lens having a positive refractive power; and
a second lens having a positive refractive power,
wherein at least one of the first lens or the second lens is a glass lens, and a total effective focal length f of the projection lens assembly, an effective focal length f1 of the first lens, and an effective focal length f2 of the second lens satisfy: $0.5<f/(f1+f2)<0.8$, wherein a radius of curvature R1 of an image-source-side surface of the first lens and a radius of curvature R4 of an image-side surface of the second lens satisfy: $-1.2<R1/R4<-0.8$, and wherein an effective semi-diameter DT11 of the image-source-side surface of the first lens and an effective semi-diameter DT22 of the image-side surface of the second lens satisfy: $0.7<DT11/DT22<1$.

10. The projection lens assembly according to claim 9, wherein the image-source-side surface of the first lens is a convex surface, and an image-side surface of the first lens is a concave surface.

11. The projection lens assembly according to claim 10, wherein an image-source-side surface of the second lens is a concave surface, and the image-side surface of the second lens is a convex surface.

12. The projection lens assembly according to claim 11, wherein a center thickness CT1 of the first lens on the optical axis and a center thickness CT2 of the second lens on the optical axis satisfy: $0.6<CT1/CT2<1.2$.

13. The projection lens assembly according to claim 11, wherein a center thickness CT1 of the first lens on the optical axis, a center thickness CT2 of the second lens on the optical axis, and a total track length of the projection lens assembly satisfy: $0.4<(CT1+CT2)/TTL<0.8$.

14. The projection lens assembly according to claim 11, wherein the total effective focal length f of the projection lens assembly and the effective focal length f2 of the second lens satisfy: $1<f/f2<1.5$.

* * * * *